US012474674B2

(12) United States Patent
Verardo et al.

(10) Patent No.: US 12,474,674 B2
(45) Date of Patent: Nov. 18, 2025

(54) METHOD FOR MANUFACTURING A SILICON BALANCE SPRING

(71) Applicant: Nivarox-FAR S.A., Le Locle (CH)

(72) Inventors: Marco Verardo, Les Bois (CH); Pierre Cusin, Villars-Burquin (CH)

(73) Assignee: NIVAROX-FAR S.A., Le Locle (CH)

( * ) Notice: Subject to any disclaimer, the term of this patent is extended or adjusted under 35 U.S.C. 154(b) by 269 days.

(21) Appl. No.: 18/197,302

(22) Filed: May 15, 2023

(65) Prior Publication Data

US 2024/0036524 A1 Feb. 1, 2024

(30) Foreign Application Priority Data

Jul. 26, 2022 (EP) .................................... 22187006

(51) Int. Cl.
*G04D 3/00* (2006.01)

(52) U.S. Cl.
CPC ......... *G04D 3/0069* (2013.01); *G04D 3/0074* (2013.01)

(58) Field of Classification Search
None
See application file for complete search history.

(56) References Cited

U.S. PATENT DOCUMENTS

2021/0109483 A1* 4/2021 Jeanneret ............. G04D 3/0089
2021/0247721 A1* 8/2021 Cusin ..................... G04B 31/06

FOREIGN PATENT DOCUMENTS

CH 717 124 A2 8/2021
TW 202141628 A 11/2021

OTHER PUBLICATIONS

European Search Report for EP 22187006.6 dated Feb. 17, 2023.

* cited by examiner

*Primary Examiner* — Binh X Tran
(74) *Attorney, Agent, or Firm* — Sughrue Mion, PLLC

(57) ABSTRACT

A method for manufacturing a silicon timepiece component (1) with a functional external profile.

7 Claims, 1 Drawing Sheet

METHOD FOR MANUFACTURING A SILICON BALANCE SPRING

CROSS-REFERENCE TO RELATED APPLICATIONS

This application claims priority to European Patent Application No. 22187006.6 filed Jul. 26, 2022, the entire contents of which are incorporated herein by reference.

TECHNICAL FIELD OF THE INVENTION

The invention relates to a method for manufacturing a silicon timepiece component, more specifically a silicon timepiece component with a functional external profile.

TECHNOLOGICAL BACKGROUND

Silicon timepiece components are typically manufactured by the deep reactive ion etching—also known as DRIE—of a wafer made of a silicon-based material. The wafer can be a silicon wafer which is etched through the entire thickness thereof (see, for example, European patent application No. 1722281, 2145857 and 3181938) or a silicon-on-insulator (SOI) substrate comprising a top silicon layer and a bottom silicon layer bonded by an intermediate silicon oxide layer, the top silicon layer being the layer in which the etching is carried out (see, for example, international patent application No. 2019/180177 and 2019/180596). Compared to a single silicon wafer, the silicon-on-insulator substrate has the advantage of having a rigid support (the bottom silicon layer, which is thicker than the top layer) making the handling and holding thereof easier, and a barrier layer (the intermediate silicon oxide layer) to stop the etching.

Regardless of the type of wafer used, several components are etched simultaneously in the same wafer and attachments or bridges left behind during etching keep the components attached to the wafer for other manufacturing steps. The components are then released from the wafer by breaking or removing the attachments.

Such attachments, which connect the periphery of each component to the wafer, can be problematic, in particular when the periphery of the component is a functional surface, whose function must not be impaired by attachment residues or when the outer surface of the component must have a particularly immaculate appearance, as in the case of a hand for example. Moreover, in some cases, in particular for components with a micro-toothing, the functional outer surface does not have a sufficiently large free space for the insertion of a sufficiently strong attachment.

The international patent application No. 2019/166922 proposes a method for manufacturing a balance spring, wherein a silicon substrate carrying a silicon oxide layer is provided, through-holes are formed in the silicon oxide layer, a silicon layer is epitaxially grown on the silicon oxide layer, this silicon layer filling the through-holes to form attachments or bridges of material, balance springs are etched in the silicon layer, the silicon oxide layer is removed, with the balance springs remaining attached to the silicon substrate via said attachments, the balance springs are subjected to heat treatments, and finally the balance springs are detached from the silicon substrate.

Using such a method, the balance springs remain bonded to the substrate after etching by attachments that extend out of the plane of the balance springs rather than between the outer surface of the last turn and the silicon etching layer as is typically the case. However, this method does not allow for the use of commercially-available silicon-on-insulator substrates, and the epitaxial growth of the silicon layer in which the balance springs will be formed is a complicated operation.

The international patent application No. 2019/166922 aims to overcome this problem and proposes a method for manufacturing a silicon timepiece component from an SOI wafer wherein the component is attached to an anchor within the contour of the component. The attachment thus does not encroach on the functional outer contour of the component. However, this method does not allow the rear face of the component to be worked on, in particular for components that require a surface treatment, or a decoration.

SUMMARY OF THE INVENTION

The invention overcomes the aforementioned drawbacks by proposing a solution that allows the components to be kept attached to the wafer, including those that do not allow attachment to the outer contour thereof, while freeing the rear face so that it can be worked on and/or decorated.

To this end, the present invention relates to a method for manufacturing a silicon timepiece component comprising the following steps of:

a) procuring an SOI wafer successively comprising a so-called silicon "device" layer, a silicon oxide bonding layer, and a so-called silicon "handle" layer;
b) growing a silicon oxide layer on the surface of the wafer;
c) etching the silicon oxide layer (etching mask) on the face, then the "device" layer by DRIE, to form the silicon timepiece component, as well as an internal anchor element and a bridge of material connecting said anchor element to an inner wall of the timepiece component in a non-critical inner contour area;
d) etching the silicon oxide layer (etching mask) on the rear face, then the "handle" layer by DRIE, to form at least one narrow bridge and at least one rear anchor integral with the at least one narrow bridge, the rear anchor being connected to the anchor element of the "device" layer by the silicon oxide "device" and "handle" bonding layer;
e) releasing the timepiece component by means of wet etching, the timepiece component being held on the wafer by the anchor element via the bridge of material, the oxide bonding layer remaining present only where both the "device" layer and the "handle" layer have not been etched away by the wet etching, and the whole resting on the at least one rear anchor connected to the at least one narrow bridge, which is itself connected to the "handle" layer.

According to other advantageous alternative embodiments of the invention:

- the inner wall of the timepiece component is the wall of a hole arranged to receive a shaft or an opening internal to the component;
- the silicon oxide bonding layer is partially present between the anchor element and the rear anchor at the end of step e);
- the narrow bridge and the bridge of material are not superimposed;
- in step d), an integrated shadow mask is also formed during the DRIE of the "handle" layer so as to produce a deliberate and intentional pattern of openings on the rear face, said openings allowing for an elaborate decoration by CVD or PVD;

- the method comprises a step f) of wafer-finishing the front and/or rear faces of the timepiece component, the finishing step consisting of depositing layers, patterning and/or decorating for example;
- the timepiece component is a wheel, a cam, a hand, a lever, a snail, an index or an applique.

The invention further relates to a timepiece component obtained by implementing a method for manufacturing a timepiece component in accordance with the invention.

It is thus understood that the method allows access to the rear face of the timepiece components attached to the wafer so as to be able to work on and/or decorate it.

BRIEF DESCRIPTION OF THE FIGURES

Other features and advantages of the invention will become apparent upon reading the following detailed description given by way of a non-limiting example, and with reference to the accompanying drawings, wherein.

DETAILED DESCRIPTION OF THE INVENTION

The invention relates to a method for manufacturing a silicon timepiece component, more particularly a silicon timepiece component having a functional external profile.

A functional external profile is understood to mean a timepiece component whose outer periphery forms a functional surface that is arranged to cooperate with other parts and/or timepiece components.

The use of a silicon-based material for manufacturing a timepiece component offers the advantage of being precise using existing etching methods and of having good mechanical and chemical properties, in particular having little or no sensitivity to magnetic fields.

Preferably, the silicon-based material used can be monocrystalline silicon, regardless of the crystal orientation thereof. It goes without saying that other silicon-based compounds or other materials can be considered, such as glass, a ceramic, a cermet, a metal or a metal alloy. For the sake of simplicity, the explanation below will be given for a silicon-based material.

The invention thus relates to a method for manufacturing a silicon timepiece component 1. Other timepiece components can be manufactured using the method according to the invention, such as a toothed wheel, an escape wheel, a lever, or a snail, etc. Such a method can also be considered for the manufacture of hands, indexes or appliques which require the external surface finish to be as immaculate as possible.

Figure 2A:
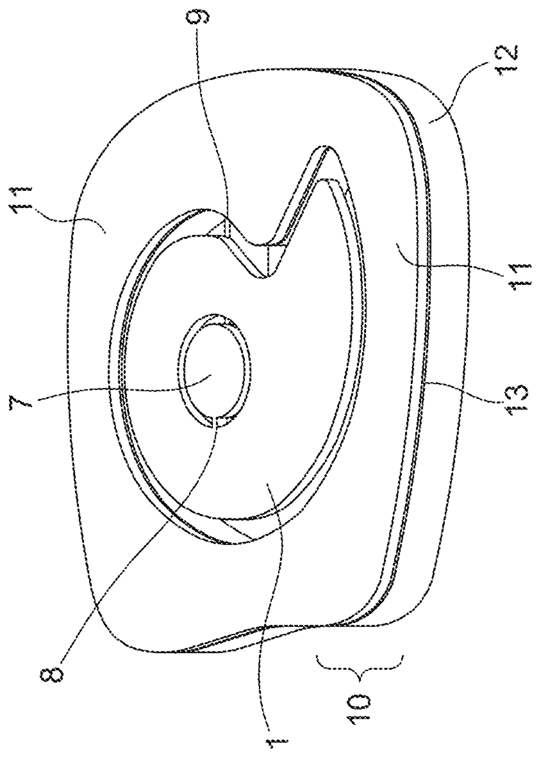
FIGS. 2*a* and 2*b* respectively show a top and bottom perspective view of a silicon component formed in an SOI wafer.
Figure 2B:
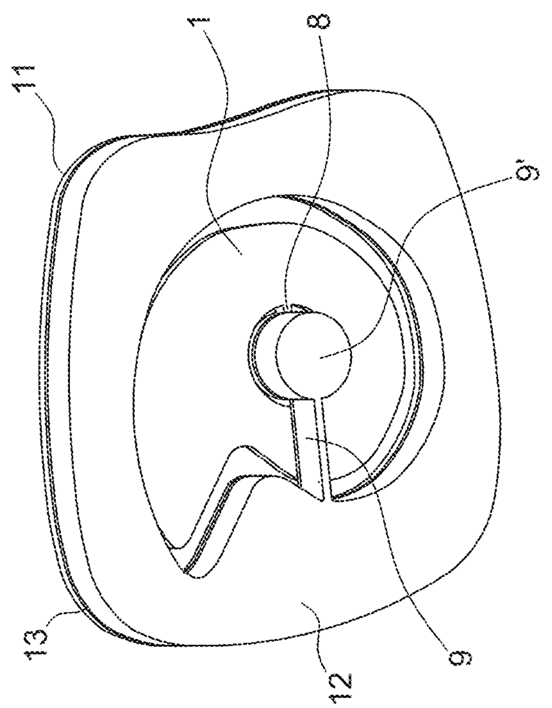

According to the invention, the method includes, as shown in FIG. 2, a first step a) which consists of procuring SOI wafers 10, i.e. wafers composed of two silicon layers 11 and 12, bonded to one another by a silicon oxide layer 13. Each of these three layers has one or more specific roles to play.

The top silicon layer 11, referred to as the "device" layer, formed in a monocrystalline silicon wafer (whose main orientations can be varied), has a thickness that will determine the final thickness of the component to be manufactured, typically, in watchmaking, between 100 and 200 μm.

The bottom silicon layer 12, referred to as the "handle" layer, essentially acts as a mechanical support, so that the method can be carried out on a sufficiently rigid assembly (which the reduced thickness of the "device" is not able to guarantee). It is also formed by a monocrystalline silicon wafer, typically of a similar orientation to the "device" layer.

The oxide layer 13 is used to closely bond the two silicon layers 11 and 12. Moreover, it will also be used as a barrier layer in subsequent operations.

The subsequent step b) consists of growing a layer of silicon oxide on the surface of the one or more wafers 10 by exposing the one or more wafers to a high-temperature oxidising atmosphere. The layer varies according to the thickness of the "device" to be patterned. It is typically between 1 and 4 μm. It goes without saying that other techniques can be used; to form an etching mask, a photoresist layer, as in the next step c), can be sufficient, and if oxide is used, it can be deposited and not grown.

Step c) of the method will allow the patterns intended to be produced thereafter in the silicon wafer 10 to be defined, for example in a positive photoresist. This step comprises the following operations of:

- depositing the photoresist, for example by spin coating, in a very thin layer typically having a thickness comprised between 1 and 2 μm,
- once dry, exposing this photoresist, having photolithographic properties, through a photolithographic mask (transparent plate covered with a chromium layer, itself representing the desired patterns) using a light source;
- in the specific case of a positive photoresist, removing the exposed areas of the photoresist using a solvent, thus revealing the oxide layer. In this case, the areas still covered with photoresist define the areas that are not to be etched in the subsequent silicon deep reactive ion etching process (also known as "D.R.I.E.").

In step c), the exposed or conversely the photoresist-covered areas are thus exploited. A first etching process allows the patterns defined in the photoresist in the previous steps to be transferred to the silicon oxide grown beforehand. Still with a view to the repeatability of the manufacturing process, the silicon oxide is patterned by dry plasma etching, which is directional and reproduces the quality of the sidewalls of the photoresist used as a mask for this operation.

Once the silicon oxide has been etched in the open areas of the photoresist, the silicon surface of the top layer 11 is thus exposed and ready for DRIE. The photoresist may or may not be preserved depending on whether or not the photoresist is to be used as an additional mask during DRIE.

The silicon that is exposed and not protected by the silicon oxide is etched in a direction perpendicular to the surface of the wafer (Bosch® anisotropic DRIE). The patterns formed firstly in the photoresist and then in the silicon oxide are "projected" into the thickness of the "device" layer 11.

When the etching opens out into the silicon oxide layer 13 bonding the two silicon layers 11 and 12, the etching stops. More specifically, following the example of the silicon oxide, which acts as a mask in the Bosch® process and is resistant to the etching process itself, the buried oxide layer 13, of the same nature, is also resistant thereto.

The silicon "device" layer 11 is thus patterned throughout the thickness thereof by defined patterns representing the components to be manufactured, now revealed by this DRIE, that is to say a cam 1 in the example shown.

The components remain integral with the "handle" layer 12 to which they are bonded by the buried silicon oxide layer 13. In this step c), a part of the top silicon layer 2 is etched to form an anchor element internal to the timepiece component, as well as a bridge of material 8 connecting this anchor element 7 to the inner wall of the timepiece component 1, in a non-critical area of the inner wall of the component.

In the example shown, the inner wall of the timepiece component is the wall of a hole arranged to receive a shaft. The hole is shaped so that the attachment residue does not interfere with the arbor cooperating with the silicon plate. The inner wall could be another opening inside the component, for example if it is skeletonised.

It goes without saying that the method cannot be limited to an etch by DRIE in step c). By way of example, the etching in step c) could just as well be achieved by chemical etching in one and the same silicon-based material.

In step c), a plurality of cams can be formed in the same wafer.

In step d), a second photolithography operation similar to the first carried out in step c) is carried out on the back of the wafer 10 (i.e. on the "handle" layer 12 side). For this purpose, the wafer 10 is turned over, the photoresist is deposited thereon and is then exposed through a mask. During this second photolithography operation, at least one narrow bridge 9 is formed through the rear of the timepiece component, as well as a rear anchor 9' integral with the at least one narrow bridge 9, the rear anchor 9' being connected to the anchor element 7 of the "device" layer by the silicon oxide layer bonding the "device" layer and the "handle" layer.

According to the invention, an integrated shadow mask is also formed during the DRIE of the "handle" layer in step d), so as to produce a deliberate and intentional pattern of openings on the rear face, said openings thus allowing an elaborate decoration to be created by CVD or PVD during a subsequent step.

The area of exposed photoresist is then removed with a solvent, thus revealing the previously formed oxide layer acting as a mask for a deep dry etch, such as DRIE, which allows the at least one narrow bridge 9, the rear anchor 9' and the shadow mask to be revealed.

In step e), in order to completely release the components, the various silicon oxide layers are thus etched by a wet etching process using a hydrofluoric acid-based solution or by hydrofluoric acid in the vapour phase. Advantageously, the cams 1 formed are held to the anchor element via the bridge of material 8, with the whole resting on the rear anchor connected to the at least one narrow bridge, which is itself connected to a frame formed in the "handle" layer.

According to an optional step of the method, step f) consists of subjecting the released workpiece still held by the attachment to various surface finishing operations. Thus, the front, rear and/or side faces of the timepiece component can be worked on while the component is still held to the wafer. The finishing step can consist of depositing layers on, or patterning or decorating the different faces of the timepiece component. These operations are functional in nature (reinforcing, tribological, etc.) or aesthetic in nature (colouring, patterning), by PVD or CVD.

In this step, the pattern developed in step d) via the shadow mask is also decorated by CVD or PVD.

Figure 1A:
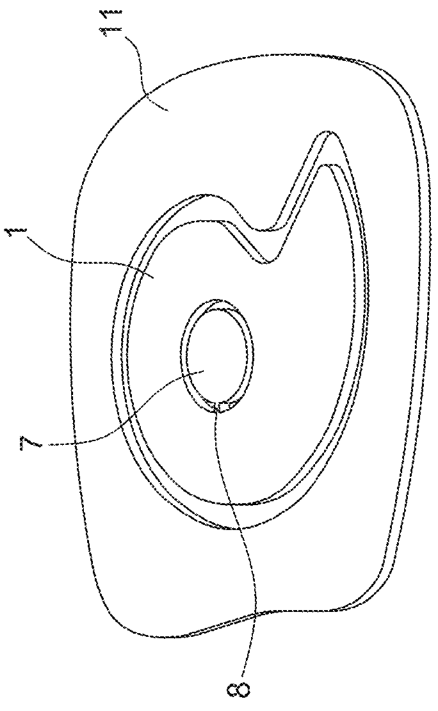
FIGS. 1*a* and 1*b* respectively show a perspective view of a silicon component integral with the "device" layer and a perspective view of the "handle" layer.
Figure 1B:
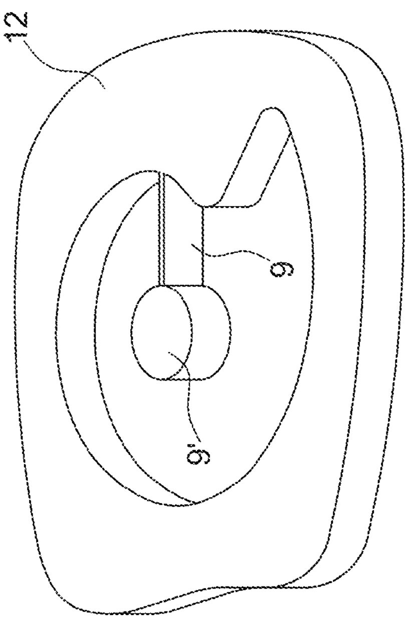

The cam 1 as shown in FIGS. 1*a* and 1*b* is thus obtained and, advantageously according to the invention, includes a silicon-based core and a silicon oxide-based coating.

Advantageously according to the invention, a timepiece component 1 including a functional external profile can thus be manufactured without further complexity.

Finally, the method can also include step h) of separating the timepiece component 1 from the wafer 10 by separating the component 1 from the anchor element 8 thereof.

It goes without saying that the present invention is not limited to the example shown, i.e. to the production of a cam, but that various alternatives and modifications that may be apparent to a person skilled in the art can be made thereto.

The invention claimed is:

1. A method for manufacturing a silicon timepiece component, comprising the following steps of:

a) procuring an silicon-on-insulator (SOI) wafer successively comprising a silicon device layer, a silicon oxide bonding layer, and a silicon handle layer;

b) growing a silicon oxide layer on a front face and a rear face of the SOI wafer;

c) etching the silicon oxide layer on the front face, then the silicon device layer by deep reactive ion etching (DRIE), to form the silicon timepiece component, as well as an internal anchor element and a bridge of material connecting said anchor element to an inner wall of the timepiece component in a non-critical area of the inner wall;

d) etching the silicon oxide layer on the rear face, then the silicon handle layer by DRIE, to form at least one narrow bridge and at least one rear anchor integral with the at least one narrow bridge, the rear anchor being connected to the anchor element of the device layer by the silicon oxide bonding layer bonding the silicon device and silicon handle layers; and e) releasing the silicon timepiece component by wet etching, the silicon timepiece component being held on the SOI wafer by the anchor element via the bridge of material, the silicon oxide bonding layer remaining present only where both the silicon device layer and the silicon handle layer have not been etched away by the wet etching, and the whole resting on the at least one rear anchor connected to the at least one narrow bridge, which is connected to the silicon handle layer so as to make all faces of the silicon timepiece component accessible, wherein the inner wall of the silicon timepiece component is the wall of a hole arranged to receive a shaft or the wall of an opening internal to the silicon timepiece component.

2. The method according to claim 1, wherein the silicon oxide bonding layer is partially present between the anchor element and the rear anchor at the end of step e).

3. The method according to claim 1, wherein the narrow bridge and the bridge of material are not superimposed.

4. The method according to claim 1, further comprising in step d) a step of forming an integrated shadow mask during the DRIE of the silicon handle layer to produce a deliberate and intentional pattern of openings on the rear face, said openings allowing for an elaborate decoration by deposition.

5. The method according to claim 1, further comprising a step f) of wafer-finishing the front, rear and/or side faces of the silicon timepiece component, the wafer-finishing step being depositing layers, patterning and/or decorating.

6. The method according to claim 1, wherein the silicon timepiece component is a wheel, a cam, a hand, a lever, a snail, an index or an applique.

7. A timepiece component obtained by implementing a method for manufacturing a silicon timepiece component according to claim 1.

* * * * *